US008671785B2

(12) United States Patent
Chen

(10) Patent No.: US 8,671,785 B2
(45) Date of Patent: Mar. 18, 2014

(54) AUTOMATED ANIMAL BITE SIMULATOR FOR TESTING CABLES

(75) Inventor: David Zhi Chen, Richardson, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 163 days.

(21) Appl. No.: 13/316,659

(22) Filed: Dec. 12, 2011

(65) Prior Publication Data

US 2013/0145869 A1    Jun. 13, 2013

(51) Int. Cl.
*G01N 3/56*    (2006.01)
*A61C 11/00*    (2006.01)

(52) U.S. Cl.
USPC .............. 73/865.6; 73/866; 433/68; 433/69

(58) Field of Classification Search
USPC ........... 73/865.3, 865.6, 866; 433/54, 56, 57, 433/68, 69
See application file for complete search history.

(56) References Cited

U.S. PATENT DOCUMENTS

| | | | | |
|---|---|---|---|---|
| 1,989,367 A | * | 1/1935 | Keeney | 433/58 |
| 4,330,276 A | * | 5/1982 | Becker et al. | 433/69 |
| 4,391,589 A | * | 7/1983 | Monfredo et al. | 433/63 |
| 4,417,873 A | * | 11/1983 | Kulas | 433/57 |
| 4,468,198 A | * | 8/1984 | Kataoka et al. | 433/63 |
| 4,668,189 A | * | 5/1987 | Levandoski | 433/55 |
| 4,781,586 A | * | 11/1988 | Lisec | 433/57 |
| 5,340,309 A | * | 8/1994 | Robertson | 433/69 |
| 5,605,456 A | * | 2/1997 | Young | 433/60 |
| 5,743,732 A | * | 4/1998 | Watson | 433/55 |
| 6,120,290 A | * | 9/2000 | Fukushima et al. | 433/69 |
| 6,422,091 B1 | * | 7/2002 | Chomik et al. | 73/851 |
| 6,511,318 B2 | * | 1/2003 | Kim | 433/74 |
| 8,021,149 B2 | * | 9/2011 | Gutman et al. | 433/69 |
| 2008/0261169 A1 | * | 10/2008 | Gutman et al. | 433/69 |
| 2009/0035739 A1 | * | 2/2009 | Alemzadeh | 434/264 |

OTHER PUBLICATIONS

Stephanie Olsen, 3D Model to Test Force of Shark's Bite, Jul. 31, 2007.*
Ramey et al., Evaluating Cable Resistance to Pocket Gopher Damage—A Review, University of Nebraska, Feb. 12, 1997.*
Arvisenet et al., Effect of Apple Particle State on the Release of Volatile Organic Compounds in a New Artificial Mouth Device, Journal of Agriculture and Food Chemistry, vol. 56, 2008.*
Cogelia et al., Rodent Biting Pressure and Chewing Action and Their Effects on Wire and Cable Sheath, 1976.*
Rodent Resistance of Fiber Optic Cable, Corning Cable Systems, Nov. 2002.*
From Human Bite to Robot Jaws, EScience News, Jun. 30, 2009.*

* cited by examiner

*Primary Examiner* — David A Rogers

(57) ABSTRACT

Methods, devices, and storage media provide for receiving a selection of parameters pertaining to an animal; receiving a selection of parameters pertaining to an animal interaction with a cable; simulating the animal interaction based on the selection of parameters pertaining to the animal and the animal interaction; collecting test data during the simulating; and storing the test data.

20 Claims, 9 Drawing Sheets

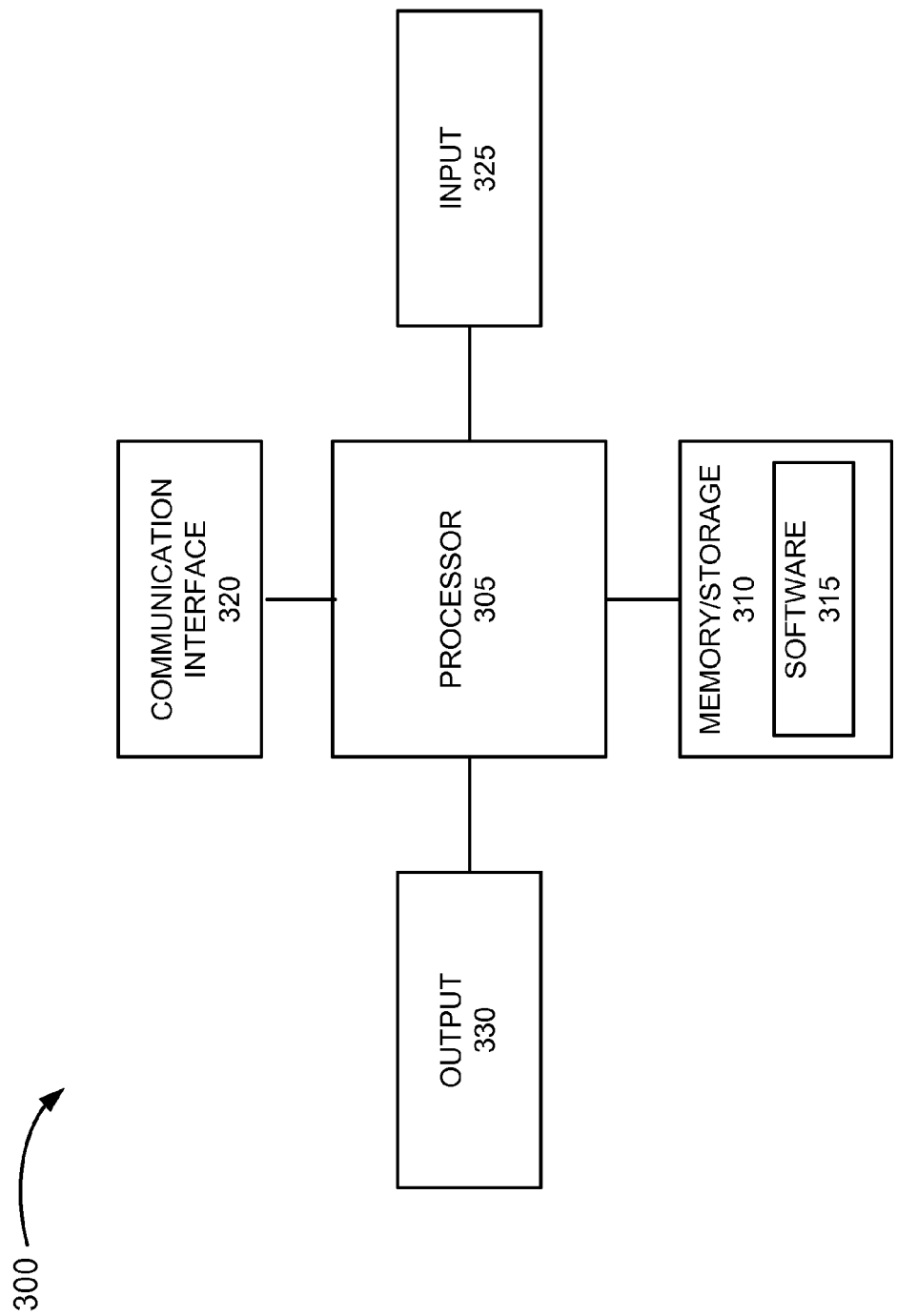

AUTOMATED ANIMAL BITE SIMULATOR FOR TESTING CABLES

BACKGROUND

The testing of cables, such as optical cables, coaxial cables, etc., can involve various parameters. For example, depending on their use, testers will subject cables to various types of conditions. As a result, the testing of cables can provide testers with various types of information, such as quality, expected life, costs, etc.

BRIEF DESCRIPTION OF THE DRAWINGS

FIG. 3 is a diagram illustrating exemplary components of a device that may correspond to one or more of the devices depicted in FIG. 1;

DETAILED DESCRIPTION OF PREFERRED EMBODIMENTS

Figure 1:
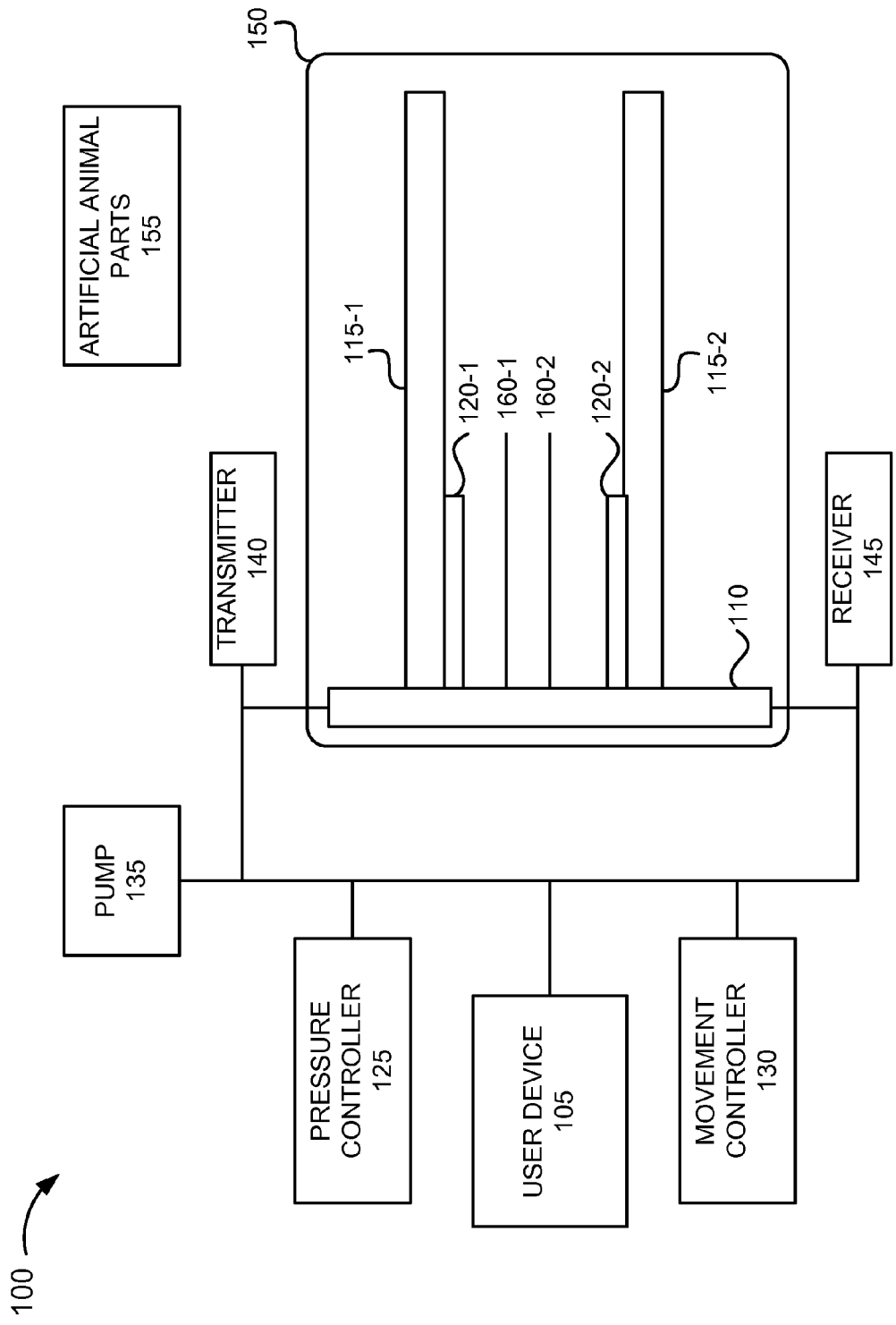
FIG. 1 is a diagram illustrating an exemplary embodiment of an animal bite simulator for testing cables.

The following detailed description refers to the accompanying drawings. The same reference numbers in different drawings may identify the same or similar elements. Also, the following detailed description does not limit the invention.

The term "cable," as used herein, includes wires (e.g., coaxial cable, twisted pair cable, undersea cable, etc.), fibers (e.g., optical fiber), lines (e.g., power line, etc.), cords (e.g., patch cord, etc.), external conduits or casings protecting wires, fibers, lines, cords, etc., and the like.

The term "animal," as used herein, includes a living creature. For example, the animal may fall into one of these categories: fish, amphibian, reptile, mammal, bird, or invertebrates. As described further below, animal bite simulations and artificial animal parts pertain to the characteristics associated with animals.

In a network, for example, cables may be used to connect devices and provide users access to the network and various services. The location of these cables can vary from underground, above ground, underwater, in a building, etc. Given their locations, cables are subject to their environment. The environment includes not only climatic conditions (e.g., weather), but also other conditions, such as animals. In this regard, animal interaction with cables is a viable and real-world testing factor for cables. However, the testing of cables relative to animals is problematic. For example, there are legal restrictions and animal cruelty concerns pertaining to the use of animals for testing purposes. Additionally, for example, there are issues of consistency associated with an animal (e.g., each animal, even of the same kind, gender, age, etc., is unique, etc.) and the interaction between the animal and a cable, as well as difficulties formulating conclusions based on test results that are gleaned from testing.

According to an exemplary embodiment, an animal bite simulator permits a user to test cables. According to an exemplary embodiment, the animal bite simulator includes artificial animal parts. According to an exemplary implementation, the artificial animal parts include artificial animal teeth, beaks, mandibles, and other types of mouthparts. According to an exemplary implementation, the artificial animal parts also include artificial saliva.

According to an exemplary embodiment, the animal bite simulator simulates animal interactions with cables using the artificial animal parts. According to an exemplary embodiment, the animal interaction includes biting, chewing, grinding, pecking, piercing, tearing, pulling, and/or some combination thereof. According to an exemplary embodiment, the animal interaction also includes salivating. In this way, the animal bite simulator creates conditions that allow the user to glean test data not only from kinetic damage (e.g., biting, etc.), but also chemical damage (e.g., due to saliva). For example, there may be different damage to a cable resulting from an animal's dry bite versus a wet bite. As an example, the artificial animal saliva may cause decay, mildew, rusting, etc., with respect to a cable. Additionally, according to an exemplary embodiment, the animal bite simulator includes an environmental chamber that allows the user to simulate particular environmental conditions. The environment (e.g., moisture, rain, heat, etc.) may also interact with (e.g., saliva) and/or cause its own damage to a cable.

According to an exemplary embodiment, the animal bite simulator collects test data in real-time and stores the test data. For example, the test data may include data pertaining to the cable, signals carried by a cable being tested, and operation of the animal bite simulator (e.g., movement of the artificial animal parts, etc.).

Test data collected by the animal bite simulator may be used as a basis for measuring, among other things, quality, sustainability, costs (e.g., repair, replacement, etc.), and other risk factors pertaining to cables and animals. Additionally, the test data collected may be considered more reliable given the user's ability to control various test parameters pertaining to animal interactions.

FIG. 1 is a diagram illustrating an exemplary embodiment of an animal bite simulator 100 for testing cables. As illustrated, animal bite simulator 100 includes a user device 105, an arm support 110, arms 115-1 and 115-2 (also referred to individually as arm 115 and collectively as arms 115), animal part holders 120-1 and 120-2 (also referred to individually as animal part holder 120 and collectively animal part holders 120), a pressure controller 125, a movement controller 130, a pump 135, a transmitter 140, a receiver 145, an environmental chamber 150, artificial animal parts 155, and supports 160-1 and 160-2 (also referred to individually as support 160 or collectively as supports 160).

The number of components and the configuration of animal bite simulator 100 illustrated in FIG. 1 are exemplary and provided for simplicity. According to other embodiments, animal bite simulator 100 may include additional components, fewer components, different components, and/or differently arranged components, than those illustrated in FIG. 1. For example, according to other embodiments, animal bite simulator 100 may not include transmitter 140, receiver 145, environmental chamber 150, and/or supports 160.

According to other embodiments, a component in FIG. 1 may be implemented as multiple components and/or multiple components may be implemented as a single component. For example, pressure controller 125 and movement controller 130 may be combined into a single component. According to another example, animal bite simulator 100 may include multiple pressure controllers 125 or multiple movement controllers 130.

User device 105 includes a computational device. For example, user device 105 may be implemented as a computer. According to an exemplary embodiment, user device 105 includes software that provides various user interfaces to allow a user to control animal bite simulator 100 and conduct tests. For example, the user may configure various test parameters, control the operation of animal bite simulator 100, and obtain test data pertaining to tests that are conducted. User device 105 is described further below.

Arm support 110 includes a structure that supports arms 115 and allows arms 115 to move in a three-dimensional manner. Arm support 110 may enclose, for example, electrical cables, hoses, etc. (not illustrated), to provide control signals to arms 115, carry solutions (e.g., artificial saliva, etc.), etc., as described further below. Arm support 110 may be made from a rigid material, such as metal or other suitable material.

Arm 115 includes a structure that supports animal part holder 120 that is used to secure an artificial animal part 155 (e.g., teeth, etc.). According to an exemplary implementation, arm 115 may be a robotic arm that provides three-dimensional movement, which may be used to simulate an animal interaction with a cable. As described further below, for example, if animal part holder 120 secures an artificial animal part 155, such as teeth, arm 115 may simulate the movement of biting or grinding of the teeth relative to a cable. Arm 115 includes the mobility capabilities to simulate this type of animal interaction, as well as other types of animal interaction, as described further below. Arm 115 may provide one or multiple degrees of freedom.

Animal part holder 120 includes a structure that secures an artificial animal part 155 to arm 115. According to an exemplary implementation, animal part holder 120 is detachable from arm 115 to permit a user to select an animal part holder 120 suitable for the artificial animal part 155 and attach the selected animal part holder 120 to arm 115. As described further below, artificial animal parts 155 may include various animal parts associated with various types of animals, which may range from small animals to large animals. As a result, a user may use various animal part holders 120 to secure various artificial animal parts 155 to arm 115.

Additional, according to some tests that may be performed, both arms 115 may not be needed, and in turn, animal part holder 120 may also not be used. For example, if a test includes simulating a bird pecking a cable, this animal interaction may be simulated using one of arms 115 and one of animal part holders 120. According to an exemplary implementation, animal part holder 120 may include a clamp mechanism to secure an artificial animal part 155. According to another exemplary implementation, animal part holder 120 may include some other type of locking and/or fastening component. According to an exemplary embodiment, animal part holder 120 permits a user (e.g., a tester) to offset artificial animal parts 155. As an example, if artificial animal parts 155 are teeth, the user can create an overbite.

Pressure controller 125 includes a component that controls the force applied to a cable by artificial animal part 155. According to an exemplary implementation, pressure controller 125 may include a servo device that controls arms 115 and the force applied to a cable. For example, animal bite simulator 100 may be programmed to simulate animal biting or chewing in which the force of teeth acting upon a cable is appropriately controlled. According to an exemplary implementation, pressure controller 125 includes sensors (e.g., pressure sensors).

Movement controller 130 includes a component that controls the movement of an artificial animal part 155 relative to a cable. According to an exemplary implementation, movement controller 130 includes a servo device that controls the movement of arms 115. According to an exemplary implementation, movement controller 130 includes sensors (e.g., motion sensors).

Pump 135 includes a pumping mechanism that provides solutions. For example, the solutions may include artificial saliva or other animal secretion. Transmitter 140 and receiver 145 include a transmitter and a receiver, respectively, to permit a user to transmit and receive a signal via the cable. A signal may be electrical, optical, etc. Environmental chamber 150 includes a container or an enclosure that is capable of providing certain environmental conditions, such as temperature, humidity, etc., water submersion, and other types of conditions that may mimic a prospective location for the cable being tested.

Artificial animal parts 155 include a collection of structures that simulate animal parts associated with animals. For example, artificial animal parts 155 may include structures that simulate animals' teeth and beaks. Additionally, for example, artificial animal parts 155 may include structures that simulate mandibles and other forms of animal mouthparts. Artificial animal parts 155 may not only include a variety of artificial animal parts pertaining to a range of various animals, but also may include artificial animal parts that are specific to gender, age, and/or other characteristics associated with a particular animal (e.g., geographic region, etc.).

As an example, artificial animal parts 155 may include artificial animal parts pertaining to alligators, sharks, dogs, cats, rats, squirrels, mice, birds, and large insects, such as beetles, etc. In this regard, a user may select artificial animal parts 155 relative to a cable and the geographic region in which the cable may be used.

According to an exemplary implementation, artificial animal parts 155 may be made from materials that provide feedback to a user. For example, assume that a cable is being tested that includes metal or some other conductive material. Artificial animal parts 155 may be made from a material that is able to be electrically charged such that if artificial animal parts 155 come into contact with a metal layer of the cable, animal bite simulator 100 detects this event.

Support 160 includes a structure to suspend or secure a cable. Support 160 may be implemented as a robotic arm. In addition to providing support for a cable, support 160 may perform other functions, such as rotating a cable or pulling the cable (e.g., in a horizontal manner, etc.) to permit artificial animal parts 155 to come into contact with various portions of the cable.

FIGS. 2A-2E are diagrams illustrating exemplary scenarios in which animal bite simulator 100 is used to simulate an animal interaction with a cable. In this example, transmitter 140, receiver 145, and environmental chamber 150 are not being used. According to this exemplary scenario, a user uses artificial animal parts 155 that are representative of an animal's teeth (e.g., an adult, male German Shepherd dog). As illustrated, a cable 205 is placed between artificial animal parts 155. Although not illustrated, supports 160 may be used to suspend and/or secure cable 205.

Figure 2A:
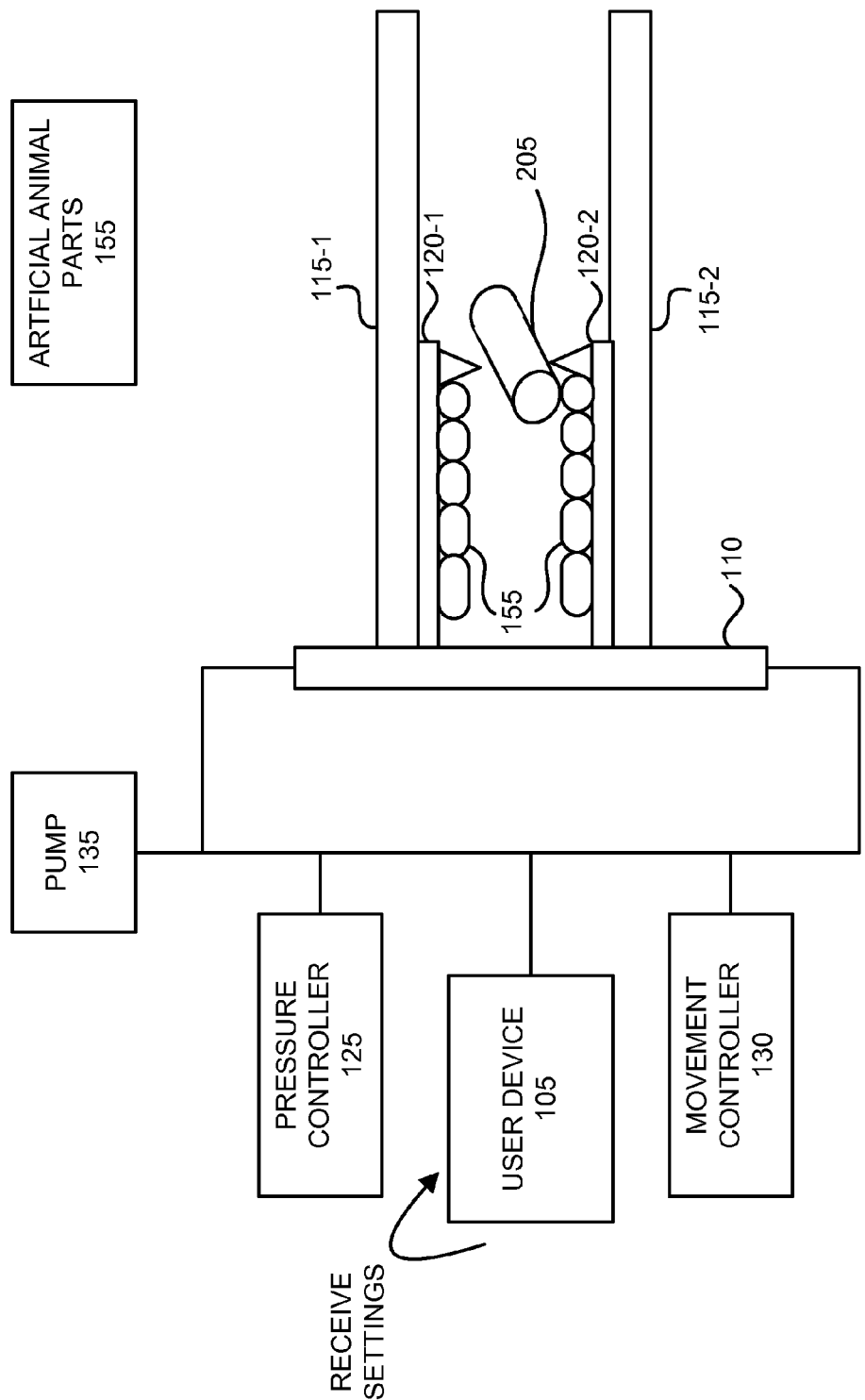
FIGS. 2A-2E are diagrams illustrating exemplary scenarios in which the animal bite simulator is used to simulate an animal interaction with a cable.

Referring to FIG. 2A, a user inputs via user device 105 various settings pertaining to the test. As previously described, user device 105 includes various user interfaces to allow a user to control animal bite simulator 100 and conduct tests. By way of example, the user is provided with a user interface to select the type of animal being simulated. The user navigates through the user interface to select an adult, male German Shepherd dog.

The user may then select various parameters pertaining to the animal interaction. For example, with reference to pressure controller 125 and according to an exemplary implementation, the user interface may permit the user to select one or more force values. For example, the user may select a minimum force and a maximum force by which arms 115 cause artificial animal parts 155 to exert force on cable 205. According to another exemplary implementation, force value(s) may be used during the test based on other parameters selected by the user, as described further below.

With reference to movement controller 130 and according to an exemplary implementation, the user interface may permit the user to select the type of animal interaction, such as, biting, grinding, chewing, etc., and/or some combination thereof. The user may select the duration for each type of animal interaction or the duration for the test. Additionally, the user interface may permit the user to select the number of times of the animal interaction (e.g., the closing and opening of arms 115, etc.).

According to another exemplary implementation, the user interface may include a parameter pertaining to the temperament of the dog. For example, a list of possible temperaments may include agitated, playful, relaxed, bored, mellow, hungry, and uninterested. According to an exemplary implementation, each temperament is mapped to a particular animal interaction. The animal interaction may include, for example, biting, grinding, chewing, or a combination thereof, force values or randomly generated force values within a particular force value range, and duration values or randomly generated force values within a particular duration range, etc., based on the selected temperament and a total duration of the test parameter.

With reference to pump 135 and according to an exemplary implementation, the user interface may permit the user to select a type of solution to be pumped during the test. For example, the user may select a light, medium, or heavy secretion of saliva to be provided during the test. According to another implementation, the amount of solution and/or the type of solution that may be used during the test may be based on other parameters (e.g., temperament, etc.) selected by the user.

The user may also select, via the user interface, the cable being tested. For example, the user may indicate that the cable is a fiber optic cable. User device 105 may include data (e.g., composition of the cable, type of cable, number of layers associated with an outer jacket or conduit protecting the fibers, etc.) pertaining to the selected cable.

Figure 2B:
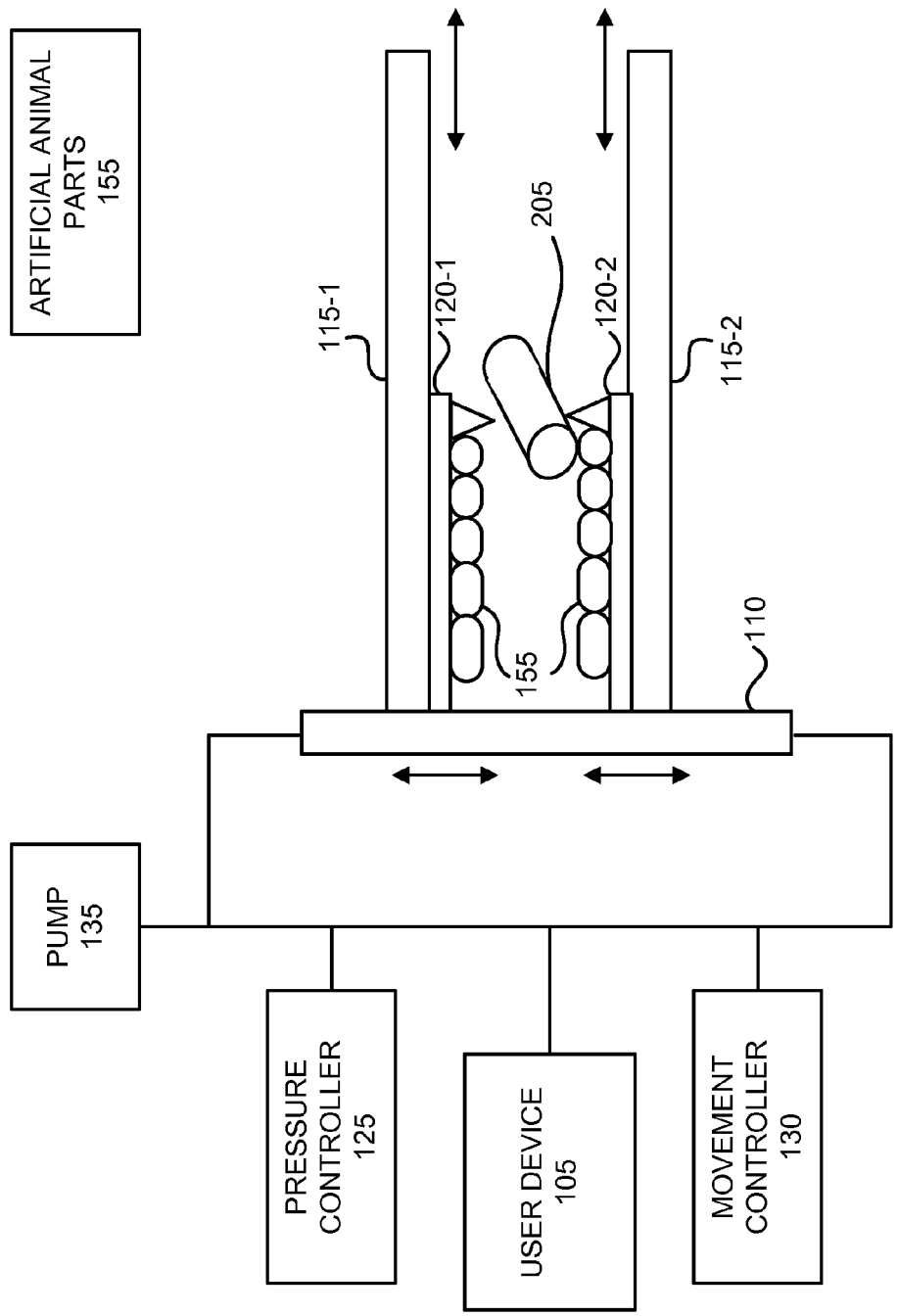

For description purposes, assume that the user selects an agitated temperament for 20 seconds. Referring to FIG. 2B, assume the user begins the test and animal bite simulator 100 operates based on the user settings. According to this scenario, arms 115 will move in a manner that simulates an agitated German Shepherd dog. Arms 115 move in a vertical, horizontal, and/or other suitable range of motion, as indicated by arrows in FIG. 2B, to cause artificial animal parts 155 (e.g. teeth of the adult, male German Shepherd dog) to interact with cable 205. Pump 135 may also supply a solution (e.g., artificial saliva of a German Shepherd dog) during the test. For example, the solution may be secreted via perforations in animal part holders 120 or through some other suitable configuration.

Figure 2C:
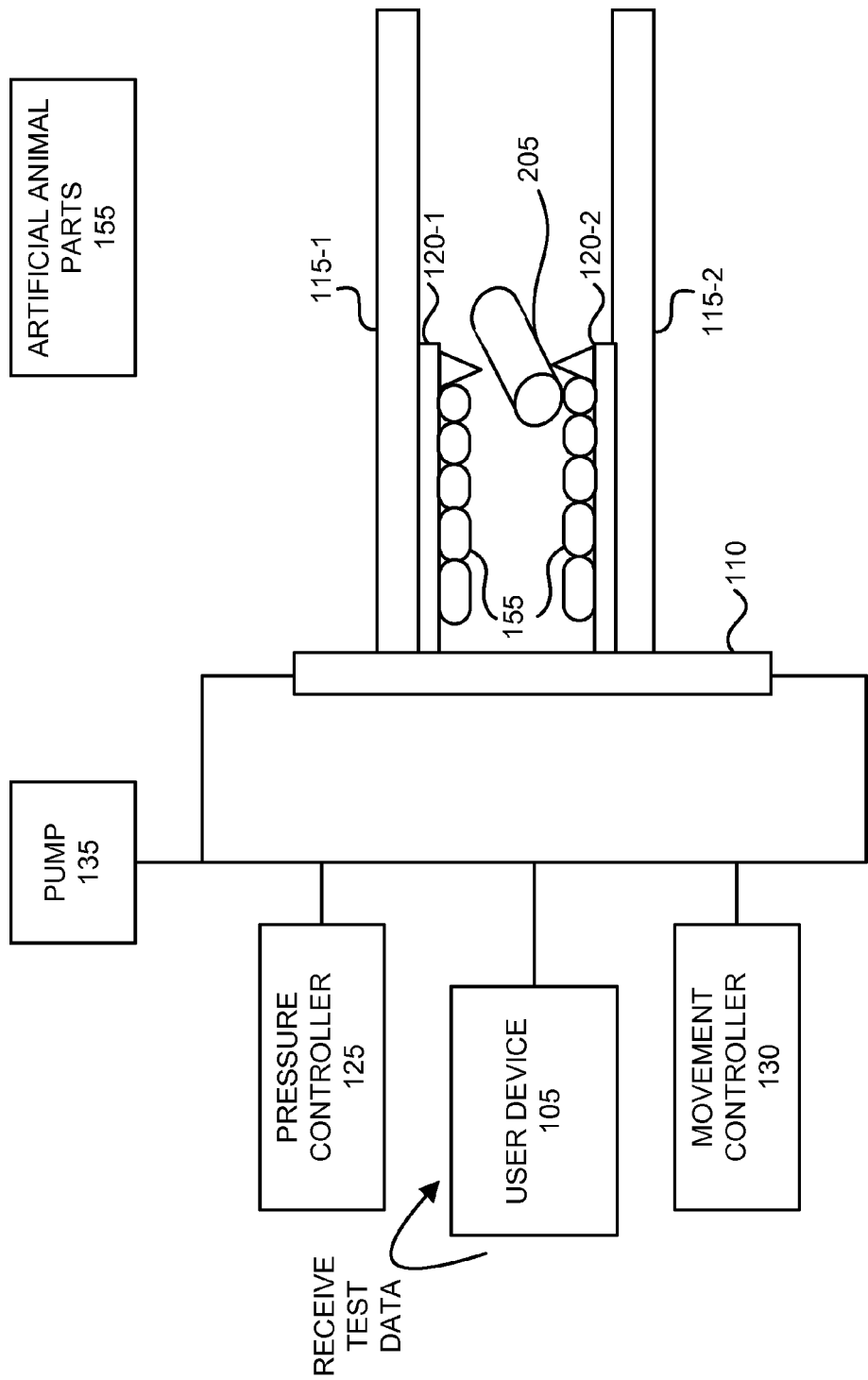

Referring to FIG. 2C, animal bite simulator 100 (e.g., user device 105) collects test data during the test. For example, the test data may include tooth penetration data, data indicating that a particular layer of a cable is penetrated, etc. In addition, as the test is being performed, a user may also visually observe the effects of the animal simulation on cable 205.

Figure 2D:
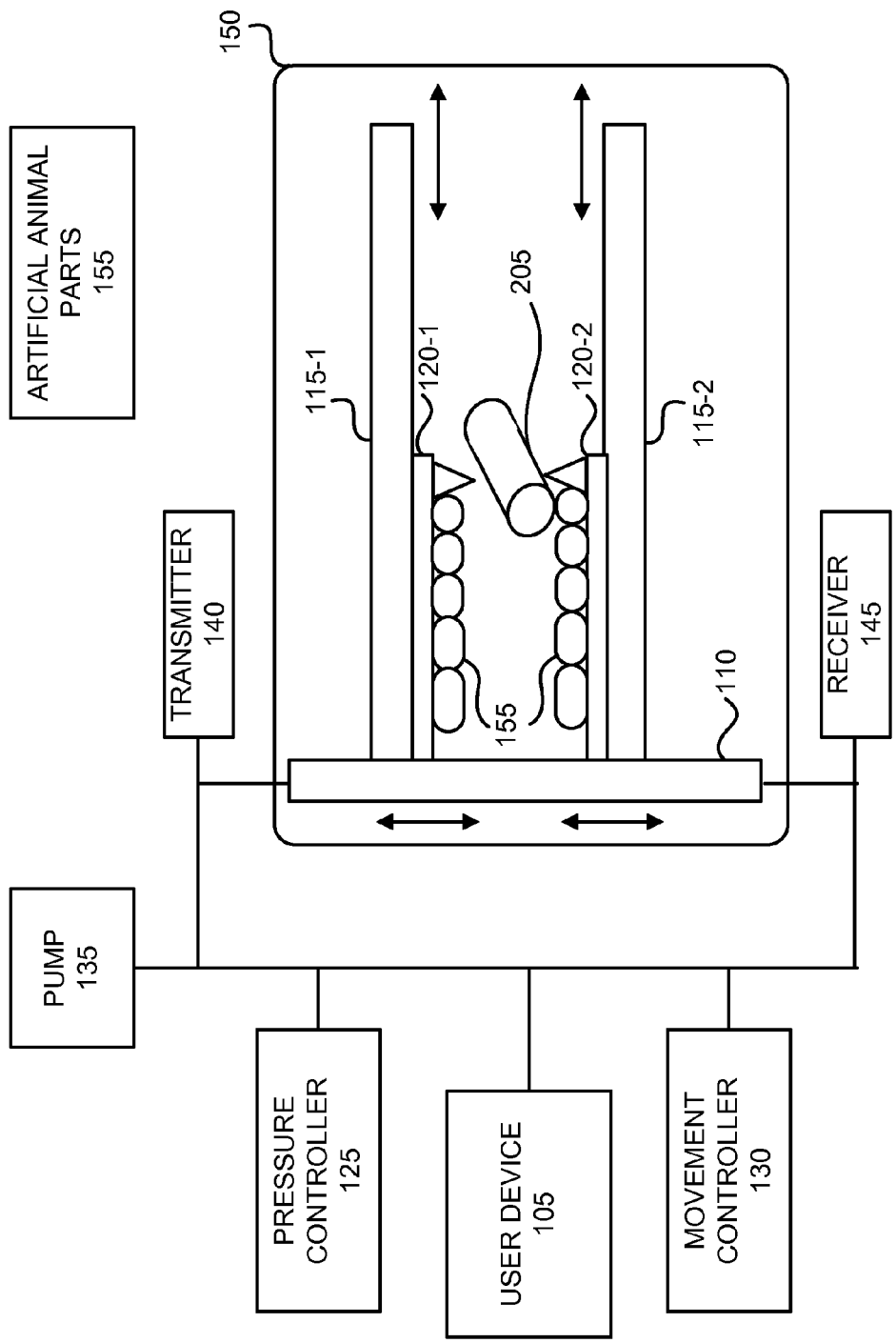

Referring to FIG. 2D, according to other exemplary scenarios, a user may elect to use transmitter 140, receiver 145, and environmental chamber 150. According to an exemplary embodiment, a user may set various parameters pertaining to these components via the user interface. For example, a user may define signal parameters (e.g., type of signal, transmit power, etc.) for a signal transmitted by transmitter 140.

User device 105 collects test data during the test pertaining to the signal received by receiver 145. User device 105 may include signal analytics to compare an original signal (e.g., transmitted by transmitter 140) to a signal received by receiver 145. The signal analytics may identify differences between the two signals as such differences occurred over time during the test. A difference may include, for example, signal power, signal amplitude, information integrity, and other types of signal characteristics. In addition, these differences may be correlated with other events (e.g., a particular bite, a particular penetration of a layer of the cable, a pressure value, etc.) associated with the test.

Additionally, according to an exemplary embodiment, the user may set various parameters pertaining to environmental chamber 150, such as temperature, humidity, etc. In this way, the user may simulate a particular environment and glean test data to identify environmental factors that contribute to the damage of a cable. Also, according to an exemplary embodiment, the user may set various parameters pertaining to supports 160, such as rotating a cable (e.g., speed of rotation, etc.), or pulling the cable (e.g., speed of pulling, the distance per pull, etc.).

Figure 2E:
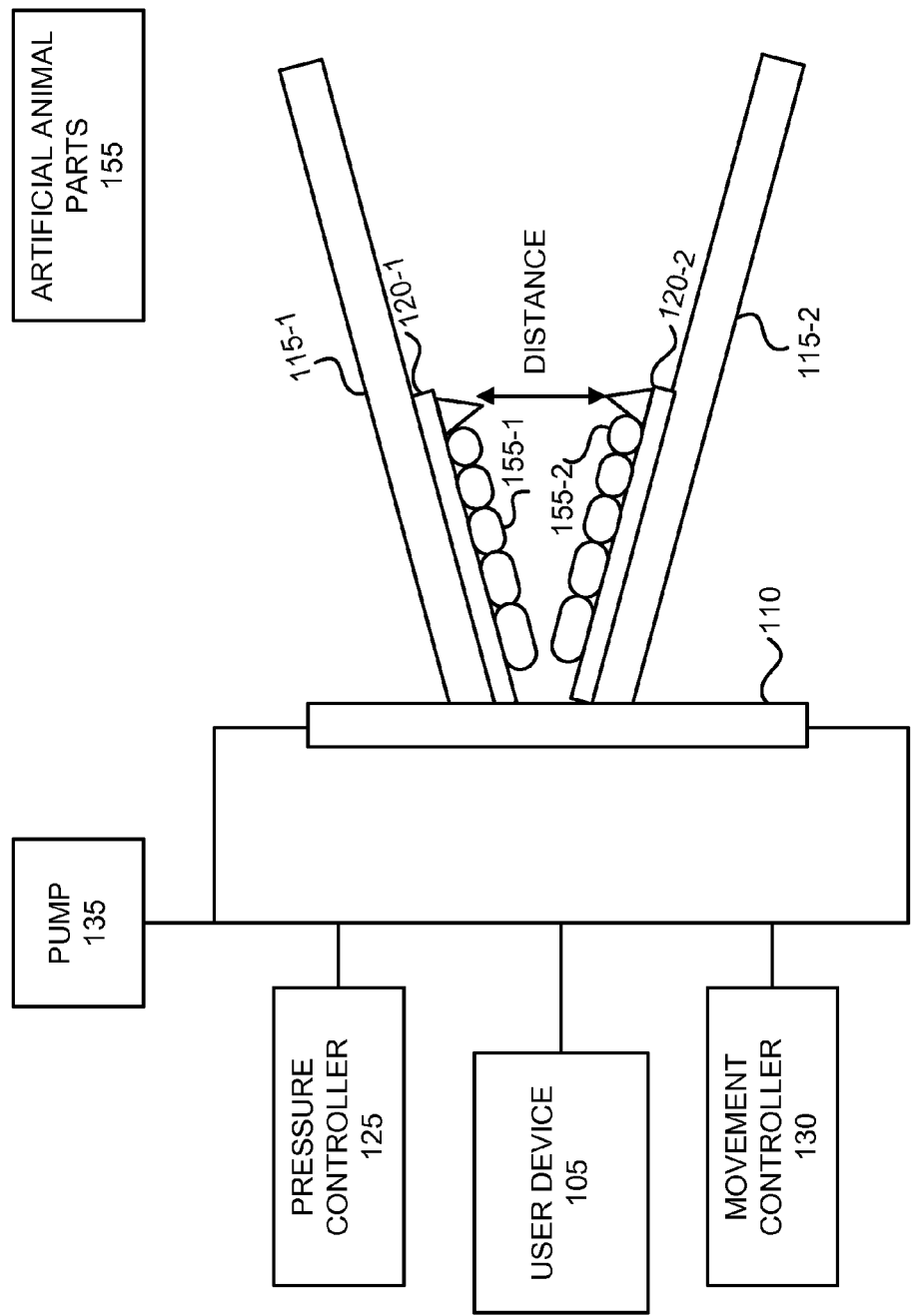

Referring to FIG. 2E, according to even other exemplary scenarios, arms 115 may adjusted at various angles and orientations. For example, as illustrated in FIG. 2E, arms 115 may be adjusted to simulate the physicality of an animal's mouth including the maximum distance between artificial animal parts 155-1 and 155-2.

FIG. 3 is a diagram illustrating exemplary components of a device 300 that may correspond to one or more of the devices depicted in FIG. 1. As illustrated, according to an exemplary embodiment, device 300 includes a processor 305, memory/storage 310 storing software 315, a communication interface 320, an input 325, and an output 330. According to other embodiments, device 300 may include fewer components, additional components, different components, and/or a different arrangement of components than those illustrated in FIG. 3 and described herein.

Processor 305 includes one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (e.g., one or multiple cores), microcontrollers, and/or some other type of component that interprets and/or executes instructions and/or data. Processor 305 may be implemented as hardware (e.g., a microprocessor, etc.), a combination of hardware and software (e.g., a SoC, an ASIC, etc.), may include one or multiple memories (e.g., memory/storage 310), etc.

Processor 305 may control the overall operation or a portion of operation(s) performed by device 300. Processor 305 may perform one or multiple operations based on an operating system and/or various applications or programs (e.g., software 315). Processor 305 may access instructions from memory/storage 310, from other components of device 300, and/or from a source external to device 300 (e.g., a network, another device, etc.).

Memory/storage 310 includes one or multiple memories and/or one or multiple other types of storage mediums. For example, memory/storage 310 may include one or multiple types of memories, such as, random access memory (RAM), dynamic random access memory (DRAM), cache, read only memory (ROM), a programmable read only memory (PROM), a static random access memory (SRAM), a single in-line memory module (SIMM), a phase-change memory (PCM), a dual in-line memory module (DIMM), a flash memory, and/or some other type of memory. Memory/storage 310 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 310 may include drives for reading from and writing to the storage medium.

Memory/storage 310 may be external to and/or removable from device 300, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray® disk (BD), etc.). Memory/storage 310 may store data, software, and/or instructions related to the operation of device 300.

Software 315 includes an application or a program that provides a function and/or a process. Software 315 may include firmware. Communication interface 320 permits device 300 to communicate with other devices, networks, and/or systems. Communication interface 320 may include a wireless interface and/or a wired interface. Communication interface 320 includes a transmitter, a receiver, and/or a transceiver.

Input 325 provides an input into device 300. For example, input 325 may include a keyboard, a mouse, a display, a touchscreen, a touchless screen, a button, a switch, an input port, speech recognition logic, and/or some other type of visual, auditory, tactile, etc., input component. Output 330 provides an output from device 300. For example, output 330 may include a speaker, a display, a touchscreen, a touchless screen, a light, an output port, and/or some other type of visual, auditory, tactile, etc., output component.

Device 300 may perform processes and/or functions, as described herein, in response to processor 305 executing software 315 stored by memory/storage 310. By way of example, the instructions may be read into memory/storage 310 from another memory/storage 310 or from another device via communication interface 320. The instructions stored by memory/storage 310 may cause processor 305 to perform one or more processes described herein. Alternatively, for example, according to other implementations, device 300 may perform one or more processes described herein based on the execution of hardware (processor 305, etc.), the execution of firmware with hardware, or the execution of software and firmware with hardware.

Figure 4:
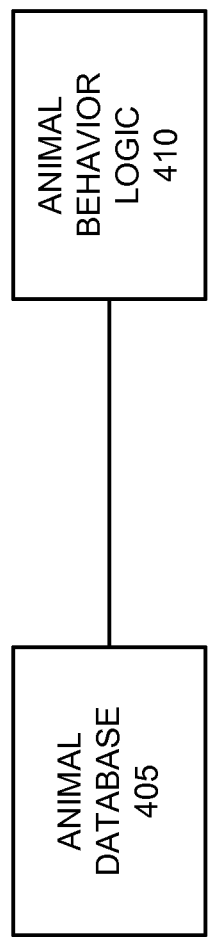
FIG. 4 is a diagram illustrating exemplary components of an exemplary user device.

As described herein, user device 105 may control the operation of animal bite simulator 100. User device 105 provides various user interfaces and includes logic to simulate animal interaction. FIG. 4 is a diagram illustrating exemplary components of an exemplary implementation of user device 105. As illustrated in FIG. 4, user device 105 includes an animal database 405 and animal behavior logic 410. According to other implementations, user device 105 may use additional, fewer, and/or different components than those illustrated and described. Additionally, or alternatively, other components of animal bite simulator 100 may store information and/or data (e.g., a database) or provide functions (e.g., logic) associated with database 405 and/or animal behavior logic 410.

Animal database 405 stores data/information pertaining to animals. For example, animal database 405 may store data/information pertaining to different types of dogs, cats, alligators, sharks, etc., and associated characteristics (e.g., age, gender, size, location, etc.). The user interface may permit a user to select a particular animal based on animal database 405.

Animal behavior logic 410 includes logic that simulates animal interaction in correspondence to an animal. For example, animal behavior logic 410 may store algorithms and data/information (e.g., values, etc.) for simulating particular animal interaction corresponding to animal information stored by animal database 405. For example, the data/information may include minimum and maximum pressure or force values that an adult, male German Shepherd dog is capable of exerting via the dog's teeth, the amount of saliva the adult, male German Shepherd is capable of salivating over a period of time, the maximum number of times the adult, male German Shepherd dog is capable of biting, chewing, etc., over a period of time, the composition of saliva from an animal (e.g., acid content, etc.), and the different types of animal interaction (e.g., chewing, biting, etc.) of the adult, male German Shepherd dog. The user interface may permit a user to select a particular animal interaction based on animal behavior logic 410. Additionally, or alternatively, the user interface may permit a user to create an animal interaction by setting various values (e.g., pressure, movement, number of repetitions, durations, etc.).

Figure 5:
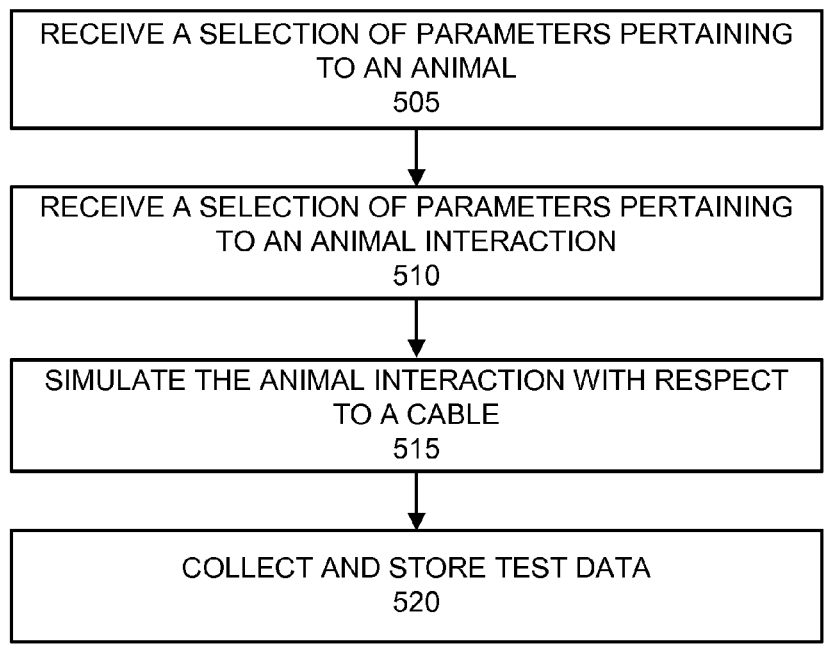
FIG. 5 is a flow diagram illustrating an exemplary process for providing animal bite simulation relative to a cable.

FIG. 5 is a flow diagram illustrating an exemplary process for providing animal simulation relative to a cable. Process 500 is performed by animal bite simulator 100. For example, processor 305 of user device 105 may execute software 315 to cause animal bite simulator 100 to perform process 500.

As illustrated, process 500 may begin with animal simulation 100 receiving a selection of parameters pertaining to an animal (block 500). User device 105 provides a user interface that permits a user to select the type of animal and characteristics associated with the animal. For example, user device 105 receives a selection of an animal (e.g., a dog), a breed (e.g., German Shepherd), an age of the animal (e.g., adult), a gender of the animal (e.g., male), and a size of the animal (e.g., medium). According to other implementations, the user interface permits the user to select other parameters pertaining to the animal, such as temperament.

In block 510, animal bite simulator 100 receives a selection of parameters pertaining to an animal interaction. User device 105 provides a user interface that permits the user to select an animal interaction characteristic of the selected animal. For example, user device 105 receives a selection of an animal interaction (e.g., biting, chewing, etc.), which may include one type of animal interaction or a series of animal interactions, and a duration of the animal interaction or test. According to an exemplary implementation, underlying parameters associated with a selected interaction (e.g., movement parameters, pressure parameters, etc.) may not need to be provided by the user. For example, user device 105 may store various parameter values necessary to simulate the animal interaction. Additionally, or alternatively, according to other exemplary implementations, the user interface may prompt or permit the user to select various parameters pertaining to the animal interaction (e.g., bite pressure or force in, for example, pounds per square inch, etc.) and provide one or more values for those selected parameters.

User device 105 provides a user interface that permits the user to select other parameters pertaining to pump 125, transmitter 140, receiver 145, and environmental chamber 150. By way of example and with reference to pump 135, the user interface permits the user to select flow rates. Additionally, the user interface permits the user to set environmental conditions (e.g., temperature, etc.) pertaining to environmental chamber 150, and parameters pertaining to transmitter 140 and receiver 145, such as signal characteristics (e.g., transmit power, duration, etc.).

According to an exemplary implementation, user device 105 provides a user interface that permits the user to set other types of parameters pertaining to a test. For example, animal bite simulator 100 may operate during the test based on feedback occurring during the test. For example, animal bite simulator 100 includes sensors (e.g., pressure sensors, movement sensors, etc.) that generate test data. The user may set parameters that regulate the operation of animal bite simulator 100 in response to the test data. For example, the user may wish to automatically stop the test when a certain layer or portion of the cable is breached. Animal bite simulator 100 detects the breach based on the test data.

According to an exemplary implementation, user device 105 provides a user interface that permits the user to select parameters pertaining to the cable being tested. For example, user device 105 stores information/data pertaining to different types of cables. User device 105 receives a selection of the type of cable (e.g., electrical, optical, power, coaxial, shielded twisted pair cable, etc.), age (e.g., new, old, etc.), gauge, outer jacket/conduit type, and other characteristics associated with the cable.

The user interface may also permit the user to enter other data pertaining to the test, such as where, in relation to artificial animal parts 155, the cable is placed. For example, if artificial animal parts 155 are teeth of an alligator, the user may wish to indicate that the cable is placed near the back portion of the teeth versus near the front portion of the teeth.

In block 515, animal bite simulator 100 simulates the animal interaction with respect to a cable. For example, as previously described, user device 105 controls the other components of animal bite simulator 100 (e.g., arms 115, pressure controller 125, etc.) to simulate the animal interaction of the selected animal. In block 520, animal bite simulator 100 collects and stores test data (e.g., tooth penetration, signal strength of signal received by receiver 145, etc.) resulting from the test.

Although FIG. 5 illustrates an exemplary process 500 for providing animal simulation relative to a cable, according to other embodiments, process 500 may include additional operations, fewer operations, and/or different operations than those illustrated in FIG. 5 and described herein. For example, process 500 may include receiving a selection of parameters pertaining to other components of animal bite simulator 100, such as transmitter 140 and receiver 145, environmental chamber 150, and/or support 160.

The foregoing description of embodiments provides illustration, but is not intended to be exhaustive or to limit the embodiments to the precise form disclosed. Accordingly, modifications to the embodiments described herein may be possible. For example, animal bite simulator 100 may also include other types of artificial animal parts. For example, animal bite simulator 100 may include artificial tongues, additional arms to simulate limbs, paws, claws, etc. Animal bite simulator 100 may simulate other types of animal interaction, such as licking, clawing, etc.

Additionally, although this description describes an exemplary user interface that permits a user to select various parameters, such as, type of animal and the animal interaction, according to other embodiments, the user interface may permit the user to simulate an animal interaction without make such selection(s). For example, the user interface may permit the user to select various parameters (e.g., pressure, duration, speed, etc.) to simulate an animal interaction without specifying the animal, etc. Also, the user interface may be configured to provide larger or smaller levels of granularity pertaining to the selection of an animal and/or the animal interaction, than that which has been described.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items.

In addition, while a series of blocks has been described with regard to the process illustrated in FIG. 5, the order of the blocks may be modified according to other embodiments. Further, non-dependent blocks may be performed in parallel. Additionally, other processes described in this description may be modified and/or non-dependent operations may be performed in parallel.

The embodiments described herein may be implemented in many different forms of software, firmware, and/or hardware. For example, a process or a function may be implemented as "logic" or as a "component." This logic or this component may include hardware (e.g., processor 305, etc.), a combination of hardware and software (e.g., software 315), a combination of hardware and firmware, or a combination of hardware, firmware, and software. The embodiments have been described without reference to the specific software code since software can be designed to implement the embodiments based on the description herein.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded as illustrative rather than restrictive.

In the specification and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

No element, act, or instruction described in the present application should be construed as critical or essential to the embodiments described herein unless explicitly described as such.

What is claimed is:
1. A method comprising:
receiving, by a device, a selection of parameters pertaining to an animal;
receiving, by the device, a selection of parameters pertaining to an animal interaction with a cable;
simulating, by the device, the animal interaction between the device and the cable based on the selection of parameters pertaining to the animal and the animal interaction, wherein the simulating comprises rotating the cable;
collecting, by the device, test data during the simulating; and
storing, by the device, the test data.
2. The method of claim 1, wherein the simulating comprises:

mechanically simulating the animal interaction including at least one of biting, chewing, grinding, tearing, or pulling of the cable.

3. The method of claim 1, wherein the simulating comprises:
mechanically simulating the animal interaction including at least one of pecking or piercing of the cable.

4. The method of claim 1, wherein the simulating comprises:
supplying artificial saliva.

5. The method of claim 1, wherein the collecting comprises:
transmitting a signal via the cable during the simulating;
comparing an original form of the signal that is transmitted to a received form of the signal; and
identifying whether a characteristic of the signal has changed based on the comparing.

6. The method of claim 1, wherein the selection of parameters pertaining to the animal include a parameter indicating a type of animal.

7. The method of claim 1, wherein the selection of parameters pertaining to the animal interaction include a parameter indicating a type of interaction capable of being performed by an artificial animal part.

8. The method of claim 7, wherein the artificial animal part includes a structure simulating animal teeth.

9. A system comprising:
a first device comprising:
a communication interface;
one or more memories that store instructions; and
one or more processors to execute the instructions to:
receive a selection of parameters pertaining to an animal;
receive a selection of parameters pertaining to an animal interaction with a cable;
cause, via the communication interface, a second device to simulate the animal interaction based on the selection of parameters pertaining to the animal and the animal interaction, wherein the animal interaction includes rotating the cable;
collect, via the communication interface, test data during the simulating; and
store the test data.

10. The system of claim 9, wherein, when causing, the one or more processors further execute the instructions to:
cause the second device to mechanically simulate the animal interaction including at least one of biting, chewing, grinding, tearing, or pulling of the cable.

11. The system of claim 9, wherein, when causing, the one or more processors further execute the instructions to:
cause the second device to mechanically simulate the animal interaction including at least one of pecking or piercing of the cable.

12. The system of claim 9, further comprising:
the second device comprising:
mechanical arms; and
an artificial animal part attached to each mechanical arm.

13. The system of claim of 12, wherein the second device further comprises:
a holder attached to each mechanical arm and each artificial animal part.

14. The system of claim 12, wherein the second device further comprises:
a pump that supplies a solution during a simulation, wherein a composition of the solution simulates animal saliva.

15. The system of claim 12, wherein the artificial animal part includes a structure to simulate animal teeth.

16. The system of claim 12, wherein the second device further comprises:
a transmitter; and
a receiver, wherein, when causing, the one or more processors further execute the instructions to:
cause the transmitter to transmit a signal, via the cable, to the receiver; and
wherein, when collecting the test data, the one or more processors further execute the instructions to:
collect test data pertaining to the signal received at the receiver.

17. The system of claim 9, further comprising:
a third device comprising:
an enclosure that encloses at least a portion of the second device, wherein, the one or more processors further execute the instructions to:
receive a selection of parameters pertaining to an environmental condition of a locale in which the cable is used; and
cause the enclosure to simulate the environmental condition during the causing of the second device to simulate the animal interaction.

18. A non-transitory storage medium storing instructions executable by a computational device to:
receive a selection of parameters pertaining to an animal;
receive a selection of parameters pertaining to an animal interaction with a cable; and
cause another device to simulate the animal interaction based on the selection of parameters pertaining to the animal and the animal interaction, wherein the animal interaction includes rotating the cable.

19. The non-transitory storage medium of claim 18, further storing instructions executable by a computational device to:
cause the other device to mechanically simulate the animal interaction including at least one of biting, chewing, grinding, tearing, or pulling of the cable.

20. The non-transitory storage medium of claim 18, further storing instructions executable by a computational device to:
cause the other device to supply a solution during the simulation of the animal interaction.

* * * * *